United States Patent
Wang et al.

(10) Patent No.: US 7,813,260 B2
(45) Date of Patent: Oct. 12, 2010

(54) METHOD FOR CONFIGURING MULTIUSER PACKET AND A STRUCTURE THEREOF IN A WIRELESS COMMUNICATION SYSTEM

(75) Inventors: Shu Wang, San Diego, CA (US); Sang Gook Kim, San Diego, CA (US); Soon Yil Kwon, San Diego, CA (US); Young Cheul Yoon, San Diego, CA (US); Li-Hsiang Sun, San Diego, CA (US); Suk Woo Lee, San Diego, CA (US); Ho Bin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 11/740,268

(22) Filed: Apr. 25, 2007

(65) Prior Publication Data
US 2007/0286238 A1   Dec. 13, 2007

Related U.S. Application Data

(60) Provisional application No. 60/795,108, filed on Apr. 25, 2006, provisional application No. 60/798,268, filed on May 5, 2006.

(51) Int. Cl.
*H04L 12/56* (2006.01)

(52) U.S. Cl. .................................. 370/203; 370/478
(58) Field of Classification Search ............... 370/203, 370/478
See application file for complete search history.

(56) References Cited

U.S. PATENT DOCUMENTS

2004/0264561 A1   12/2004  Alexander et al.
2007/0250638 A1*  10/2007  Kiran et al. ................. 709/236

FOREIGN PATENT DOCUMENTS

WO     2005/099195 A1   10/2005
WO     2006/081574 A1    8/2006

OTHER PUBLICATIONS

Raulefs, R. et al. "Rotated spreading sequences for broadband multicarrier-CDMA", Oct. 2003, Vehicular Technology Conference, 2003. VTC 2003-Fall. 2003 IEEE 58th.*
Keller, T., et al., "Adaptive Multicarrier Modulation: A Convenient Framework for Time-Frequency Processing in Wireless Communications", IEEE Proceedings of the IEEE, vol. 88, No. 5, May 2000.

* cited by examiner

*Primary Examiner*—Melvin Marcelo
(74) *Attorney, Agent, or Firm*—Lee, Hong, Degerman, Kang & Waimey

(57) ABSTRACT

A method of configuring a sub-slot having a layer-modulated multi-user packet (MUP) is disclosed. More specifically, the method comprises modulating symbols associated with a first layer by using non-layered modulation scheme, and modulating symbols associated with a second layer and a third layer using a different layered-modulation scheme. Here, the symbols associated with the second layer and the third layer are multiplexed by any one of an orthogonal frequency division multiplexing, a code division multiplexing, a multi-carrier code division multiplexing, or a time division multiplexing.

20 Claims, 19 Drawing Sheets

(a)          (b)          (c)

FIG. 12
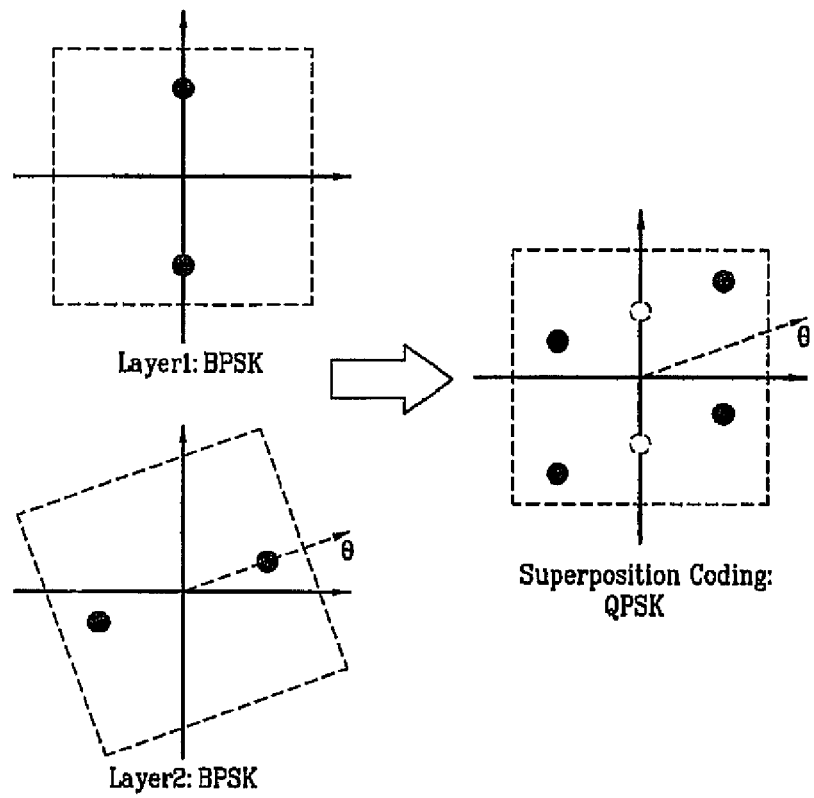
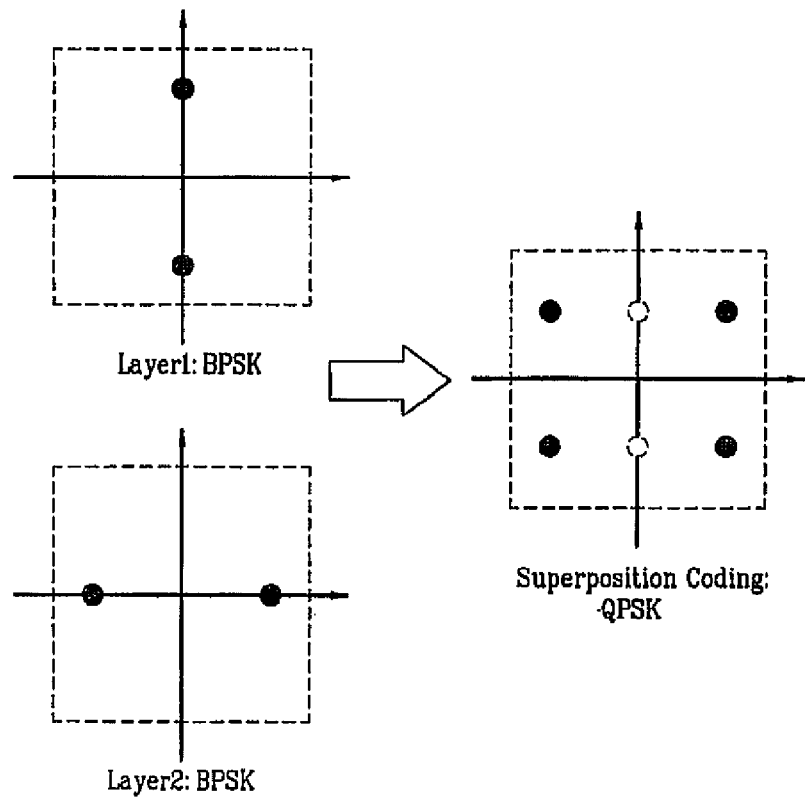

FIG. 15

| (7) MAC Id (SPC) | (2) # of layers | (7) MAC Id (Layer1) | (4) $\alpha_1$ | (3) Payload (Layer1) | (7) MAC Id (Layer2) | (4) $\alpha_2$ | (3) Payload (Layer2) | (7) MAC Id (Layer3) | (4) $\alpha_3$ | (3) Payload (Layer3) | Data for Layer1 user(s) |
|---|---|---|---|---|---|---|---|---|---|---|---|

FIG. 16
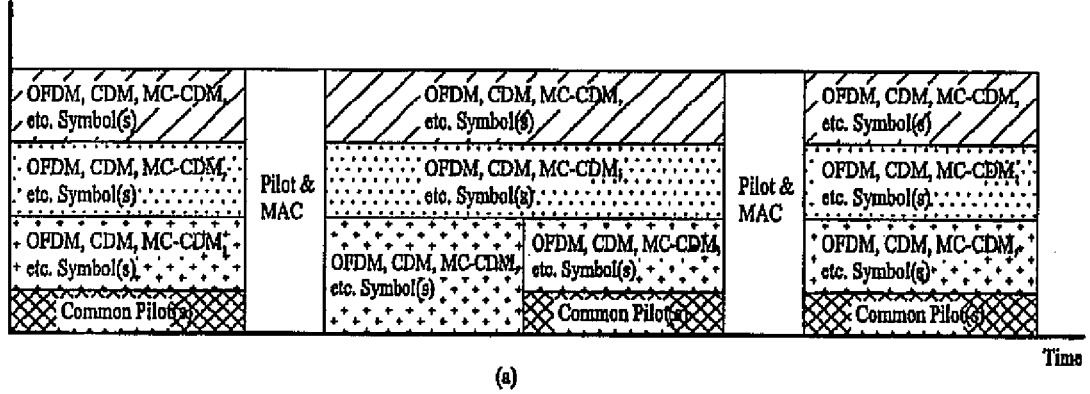
(a)
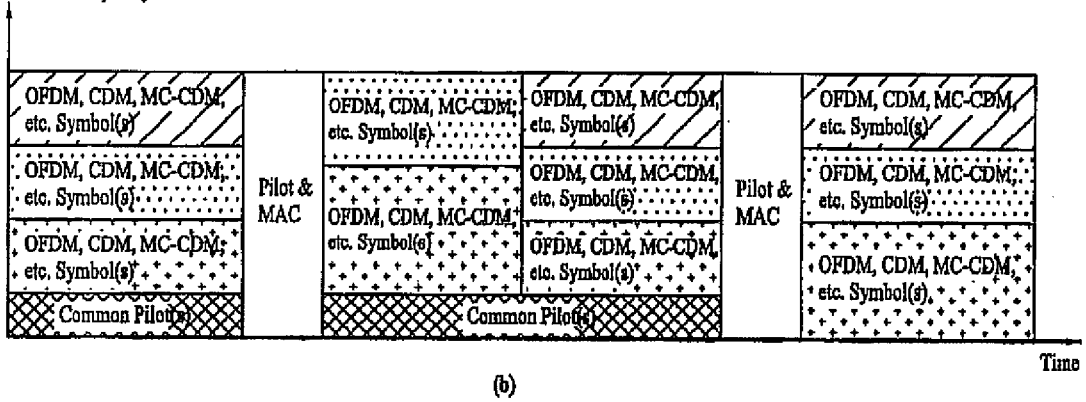
(b)
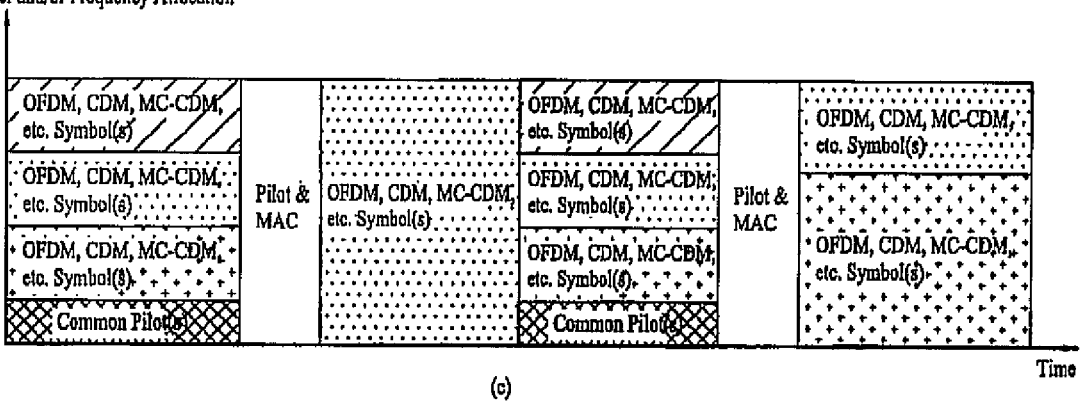
(c)

FIG. 18
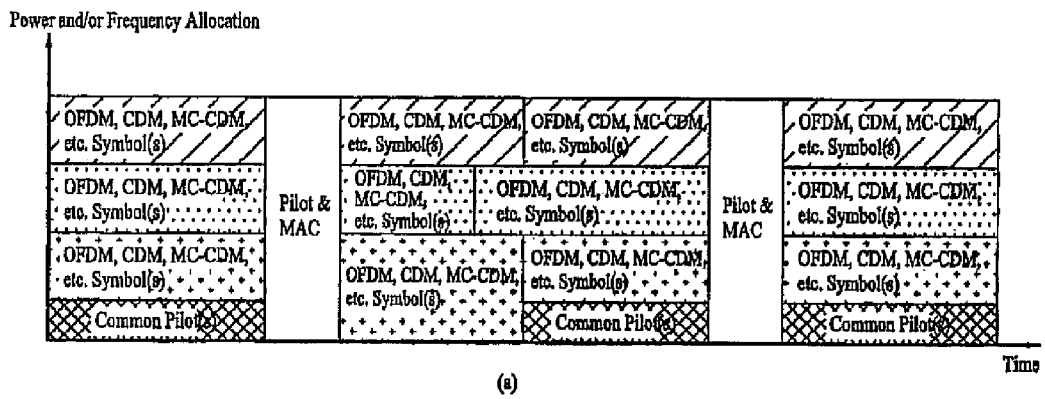
(a)
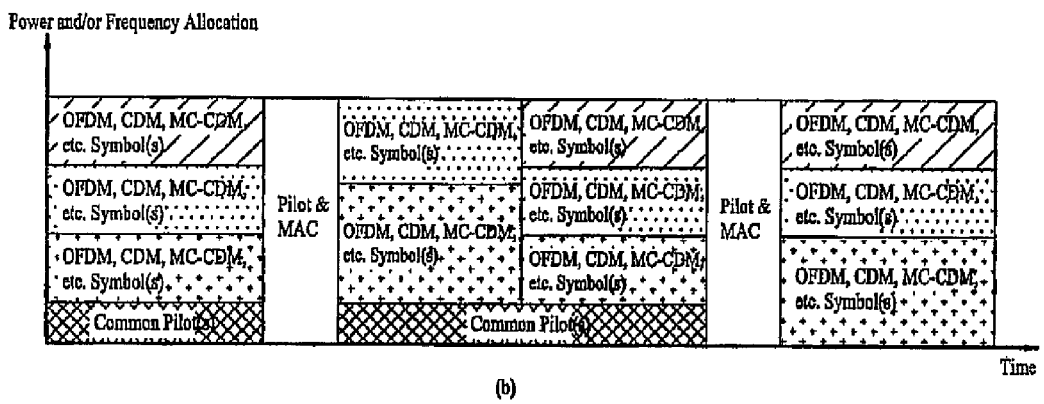
(b)
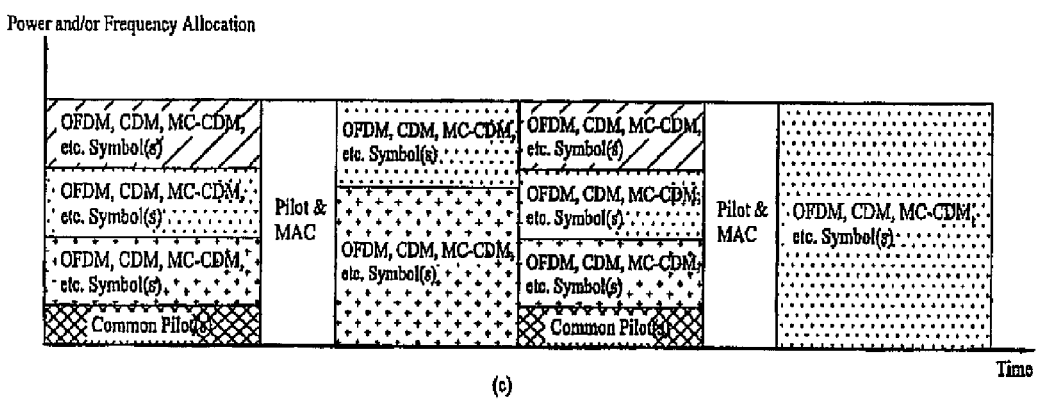
(c)

FIG. 19
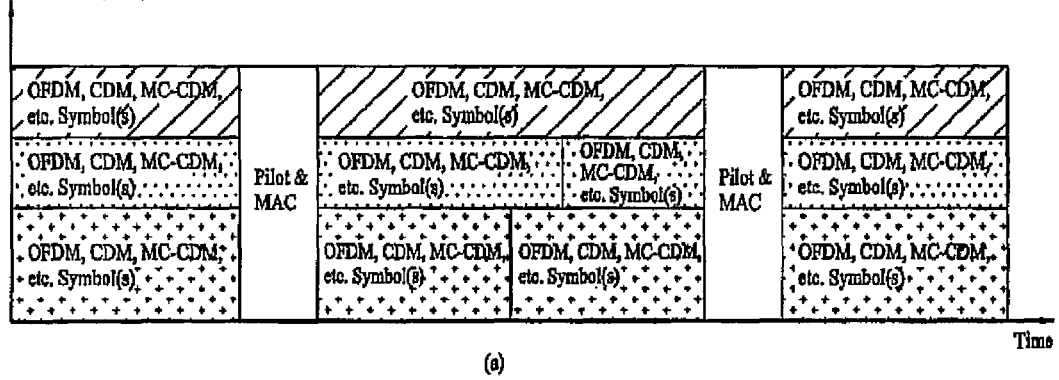
(a)
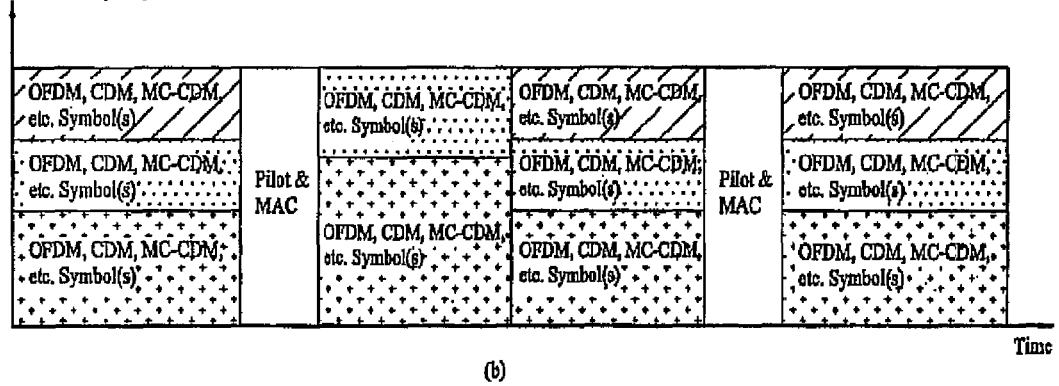
(b)
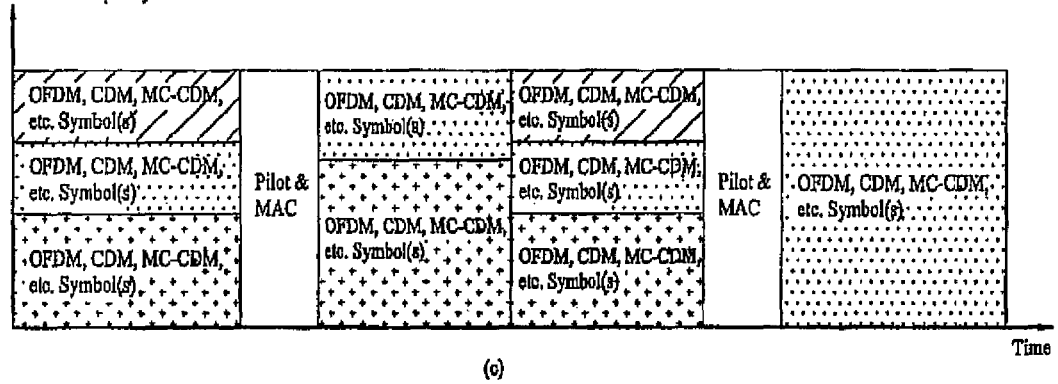
(c)

US 7,813,260 B2

METHOD FOR CONFIGURING MULTIUSER PACKET AND A STRUCTURE THEREOF IN A WIRELESS COMMUNICATION SYSTEM

This application claims the benefit of U.S. Provisional Application No. 60/795,108 filed on Apr. 25, 2006 and U.S. Provisional Application No. 60/798,268 filed on May 5, 2006, which are hereby incorporated by reference.

BACKGROUND OF THE INVENTION

1. Field of the Invention

The present invention relates to a method of configuring a multiuser packet, and more particularly, to a method of configuring a multiuser packet and a structure thereof in a wireless communication system.

2. Discussion of the Related Art

Today, users of wireless communication enjoy freedom of mobility. That is, the user with a mobile terminal is able to travel from one place to another while talking to someone without losing connection. Often, a user moves from one service coverage area to another service coverage area (e.g., from one cell to another cell). In other words, the user receives service from one coverage area serviced by one base station (BS) (or an access network) to a different coverage area serviced by another BS. This is necessary since a mobile terminal can be connected to only one BS at a time.

When moving from one service coverage area to another service coverage area, it is important to the user to be able to continue to receive service without interruption or losing connection. This is generally referred to as a handoff (or handover). Further, in a more traditional sense, it is also very important for the user to continue to effectively receive service in the current service coverage area absent handover situation.

To this end, it is important that the signals from the BS are transmitted to at least one receiving end (e.g., mobile station or access terminal) more efficiently and more reliably. At the same time, it is important for the data from one to multiple user(s) to another one to multiple user(s) to be transmitted more efficiently and more reliably.

SUMMARY OF THE INVENTION

Accordingly, the present invention is directed to a method of configuring a multiuser packet and a structure thereof in a wireless communication system that substantially obviates one or more problems due to limitations and disadvantages of the related art.

An object of the present invention is to provide a method of configuring a sub-slot having a layer-modulated multi-user packet (MUP).

Another object of the present invention is to provide a method of transmitting at least one layer-modulated sub-packet.

In a further object of the present invention is to provide a method of receiving at least one layer-modulated sub-packet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method configuring a sub-slot having a layer-modulated multi-user packet (MUP) includes modulating symbols associated with a first layer by using non-layered modulation scheme, and modulating symbols associated with a second layer and a third layer using a different layered-modulation scheme. Here, the symbols associated with the second layer and the third layer are multiplexed by any one of an orthogonal frequency division multiplexing, a code division multiplexing, a multi-carrier code division multiplexing, or a time division multiplexing.

In another aspect of the present invention, a method of configuring a slot having a superposition coded multi-user packet includes modulating symbols associated with a first layer by using layered-modulation scheme, wherein the symbols associated with the first layer are multiplexed by any one of an orthogonal frequency division multiplexing, a code division multiplexing, a multi-carrier code division multiplexing, or a time division multiplexing, and modulating symbols associated with a second layer and a third layer using a different layered-modulation scheme, wherein the symbols associated with the second layer and the third layer are multiplexed by any one of an orthogonal frequency division multiplexing, a code division multiplexing, a multi-carrier code division multiplexing, or a time division multiplexing.

In a further aspect of the present invention, a method of transmitting at least one layer-modulated sub-packet includes if at least one layer successfully transmits the sub-packet while at least one other layer fails to successfully transmit the sub-packet, the at least one layer, which successfully transmits the sub-packet transmits a new sub-packet while the at least one other layer, which fails to successfully transmit the sub-packet, re-transmits the sub-packet.

Yet, in another aspect of the present invention, a method of receiving at least one layer-modulated sub-packet includes if at least one layer successfully decodes the sub-packet while at least one other layer fails to successfully decodes the sub-packet, the at least one layer, which successfully decodes the sub-packet, transmits a new sub-packet while the at least one other layer, which fails to successfully decode the sub-packet, re-transmits the sub-packet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 illustrates an example of layer 1 and layer 2 both modulated according to the BPSK scheme;

FIG. 15 is an exemplary diagram illustrating a layer of the lowest layer packet;

FIG. 16 is an exemplary diagrams illustrating superposition-coded MUP with common pilots;

FIG. 18 is another diagram illustrating superposition-coded MUP with common pilots; and FIG. 19 is an exemplary diagram illustrating superposition-coded MUP without coexisting common pilots.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In a wireless communication system, data or data stream(s) can be sent from a single user or multiple users via terminal(s) which can be represented by one or more antennas. In other words, the data streams can be transmitted from a single source or multiple sources via a single transmitter or multiple transmitters to one or more users (or receivers). That is, the same transmitter can be used to transmit the data streams (or signals) from the single source or multiple sources. Alternatively, different transmitters can be used to transmit the data stream from the single source or multiple sources. Furthermore, the data stream transmitted from the single source can carry the same data from a single application or multiple different applications. Moreover. The data streams transmitted from different sources can carry the same data or different data.

Figure 1:
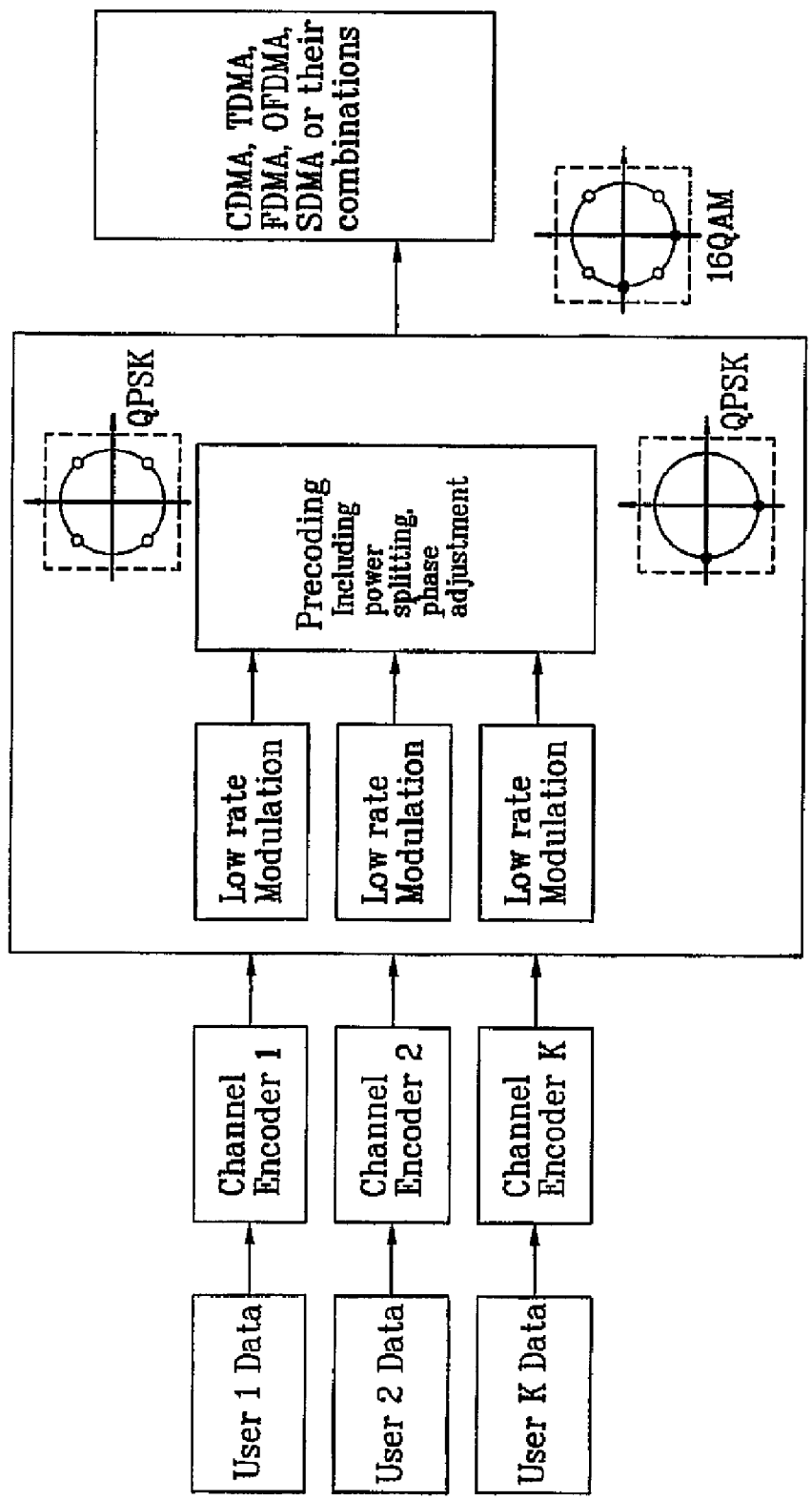
FIG. 1 is an exemplary diagram illustrating superposition modulation or layered-modulation.

FIG. 1 is an exemplary diagram illustrating superposition modulation or layered-modulation. More specifically, referring to FIG. 1, each user's signal or data stream can be modulated with a modulation scheme such as a low-order modulation scheme. Thereafter, the superposition modulated or layered-modulated sub-streams can again be multiplexed (or superpositioned) by other multiplexing schemes. Consequently, the data streams can be efficiently multiplexed without requiring additional processing gain and/or additional frequency/time.

As shown in FIG. 1, the channel coded data streams are modulated using a low rate modulation, followed by pre-coding (or superpositioning/multiplexing). Here, each channel coded data stream is modulated by a quadrature phase shift keying (QPSK), and they are pre-coded or superpositioned to 16 quadrature amplitude modulation (QAM). The pre-coding includes power splitting as well as phase adjustment.

When multiple users are simultaneously accommodated within a specified time-frequency slot, various multiplexing schemes and combinations thereof can be used. With superpositing, where a single symbol can serve multiple users.

More specifically, for example, a user capacity of a channel is traditionally bound by a symbol rate (or baud rate). Usually, one symbol can only serve one user. Moreover, a number of multiplexed data streams cannot exceed a processing gain, $G_p$, of each physical channel or tone, However, by using superpositioning preceding, one symbol can serve $N_m$ users, allowing for increase in the channel user capacity. Simply put $N \leq N_M \times G_p$.

To illustrate this point regarding superposition pre-coding, consider that a single transmitter can be used to transmit simultaneously data streams to several receiving ends (or users). The data streams can be the same (e.g. TV broadcast) or it may be different for each user (e.g., base station transmitting user-specific information). In addition, assumption can be made that independent data streams are sent to each user from the transmitter having multiple antennas.

That is, in transmitting the multiplexed or superposited sub-streams (or symbols), the same combined symbols can be transmitted through the whole beamforming array. This can be referred to as coherent beamforming. Alternatively, each symbol or sub-stream (e.g., some subset of the symbol constellation or each user's sub-symbol) can be transmitted separately or independently through different antennas. This can be referred to as coherent multi input, multi output (MIMO).

Furthermore, if there are multiple beams used for transmission, more user capacity gain can be achieved through spatial multiplexing. More specifically, each beam can carry composite symbol (e.g., single-beamforming or coherent beamforming). Alternatively, each low-order-modulated symbol or sub-stream can be transmitted through a single beam, for example. Alternatively, a combination of the beamforming schemes can be used, which can be described as some beams can carry composite symbols and some beams can be transmitted through a single beam.

In addition, space-time block coding (STBC) can be employed. More specifically, in case of a single-stream STBC, the STBC can be performed after modulation multiplexing or superpositioning and/or performed on multiple inputted low-order-modulated symbols or sub-streams. In case of multi-stream STBC, each sub-stream can be treated as a single STBC, each low-order-modulated symbol or sub-stream can be transmitted through a single STBC stream, and/or some STBC streams can use a combination of the aforementioned schemes, in which each of some streams are treated as a single-stream STBC and each of some low-order-modulated streams is transmitted through a single STBC stream.

In order for successful performance by the superposition scheme, a predetermined rate/power splitting for each user from the transmitting end and the SIC from the receiving end is needed, for example. Further discussions regarding power splitting are made below. If the rate or power slitting is not predetermined, the transmitter will signal the receiver(s) beforehand or at the same time using upper-layer signaling, or preamble or different pilot pattern.

Figure 2:
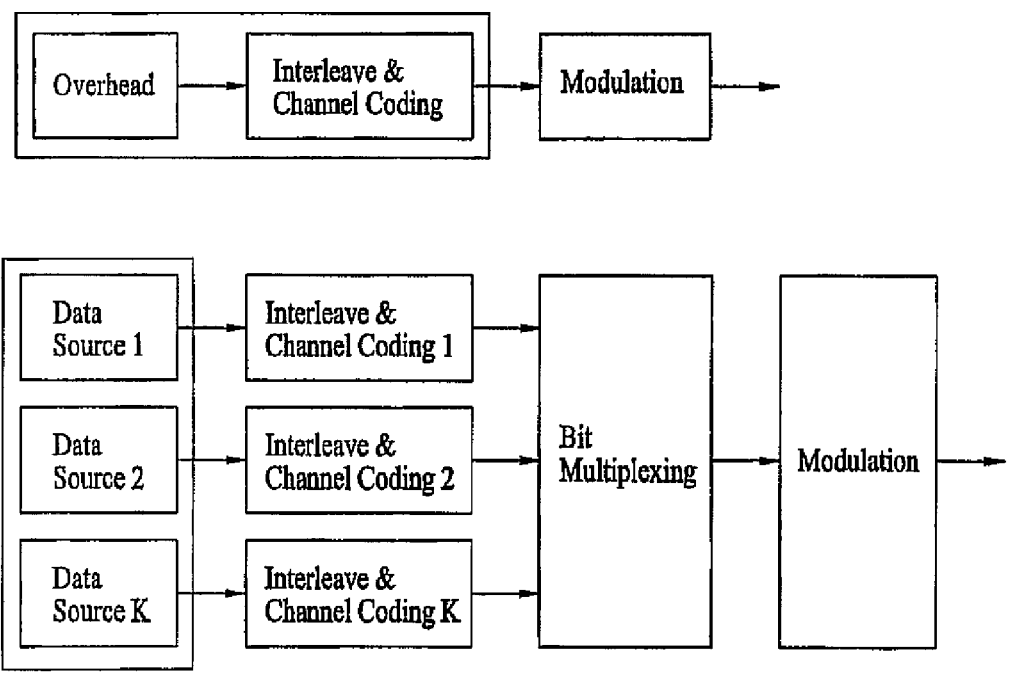
FIG. 2 is an exemplary diagram illustrating a process of a multiuser packet (MUP) with a separate overhead channel.

FIG. 2 is an exemplary diagram illustrating a process of a multiuser packet (MUP) with a separate overhead channel. Referring to FIG. 2, the data streams from multiple sources (e.g., data 1-data K) can be interleaved and channel coded by different channel coding schemes. After the data streams are channel coded, the coded data streams can be multiplexed by bit multiplexing scheme and then modulated. Here, the modulation of the coded data streams can be modulated using a low-order modulation scheme.

Furthermore, overhead information can be processed separately from data processing. Similarly, the overhead information can be interleaved and channel coded as well. Thereafter, the coded overhead information is then modulated. Again, it is possible to apply a low-order modulation scheme. Here, the overhead information is modulated a separate overhead channel.

Figure 3:
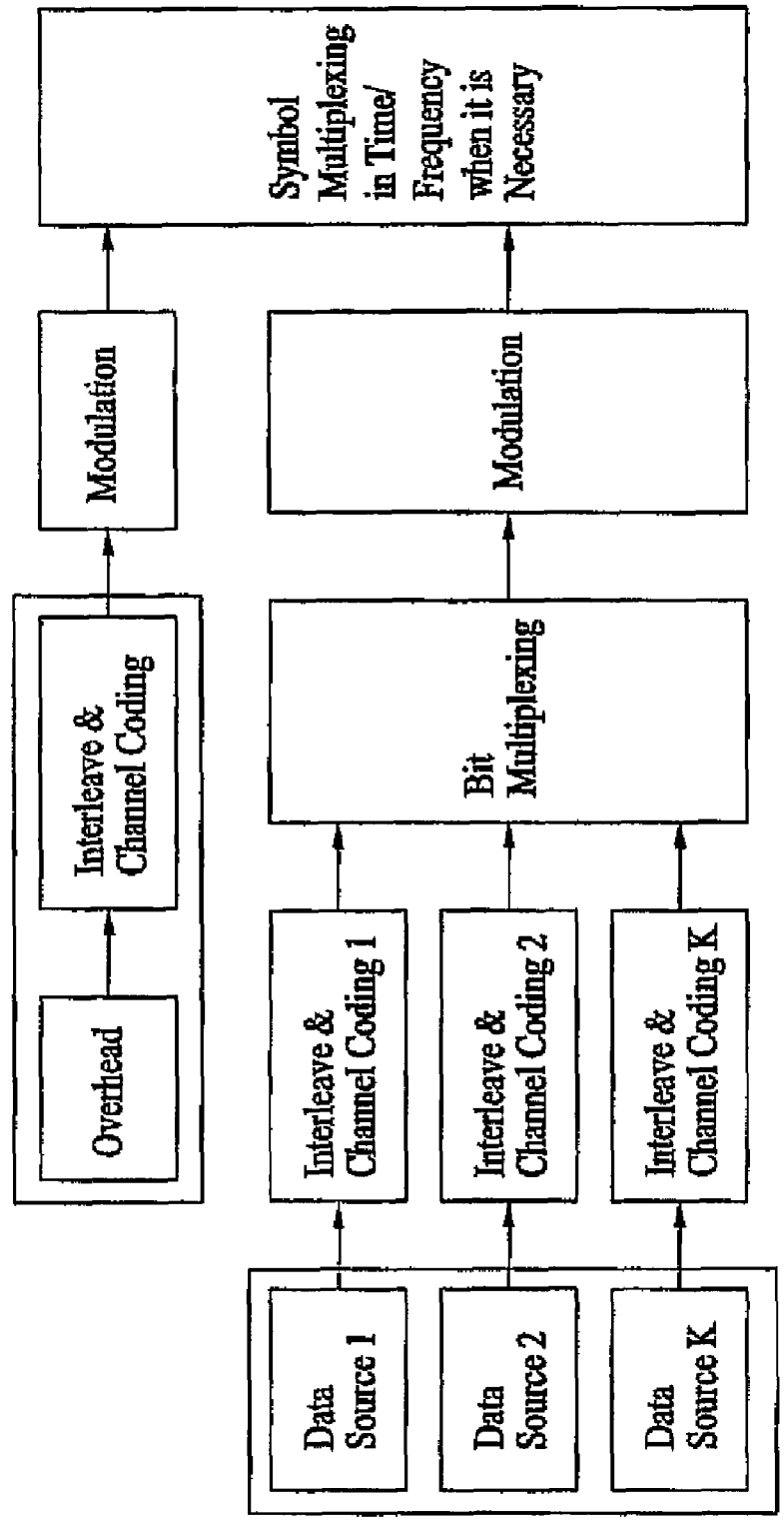
FIG. 3 is an exemplary diagram illustrating bit multiplexing of coded MUP with symbol-level multiplexed overhead channel.
Figure 4:
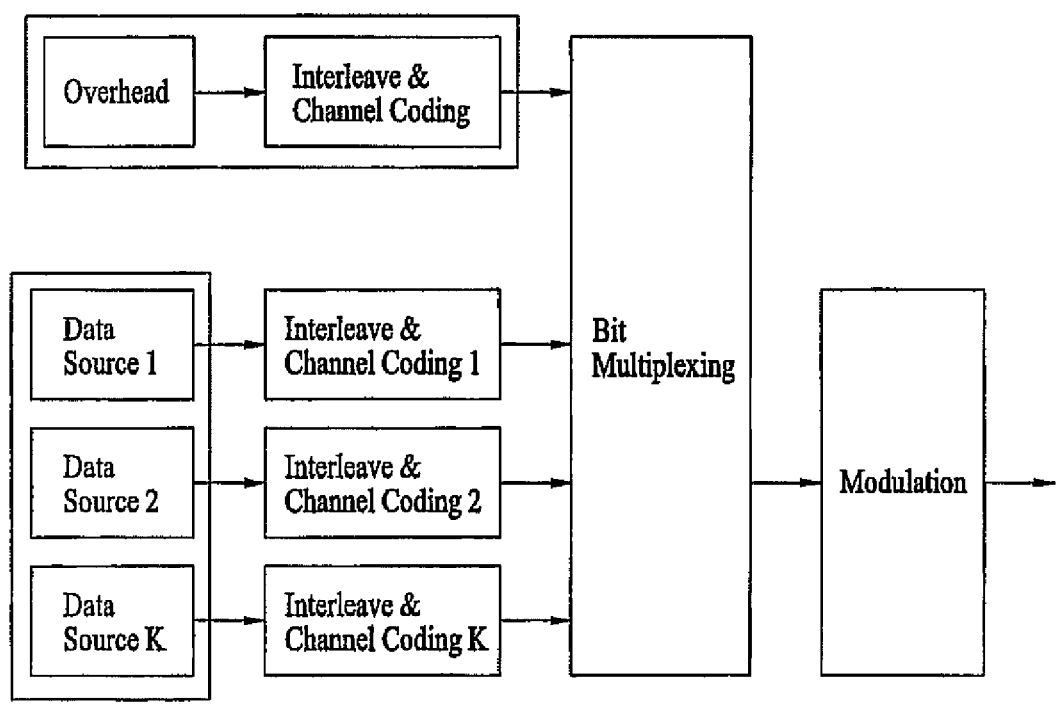
FIG. 4 is an exemplary diagram illustrating bit multiplexing of coded MUP with bit-level multiplexed overhead channel.

FIG. 3 is an exemplary diagram illustrating bit multiplexing of coded MUP with symbol-level multiplexed overhead channel. Here, the process of modulating the data streams and the overhead information are described in FIG. 2. Moreover, as described with respect to FIG. 1, the data streams and overhead are separately processed. However, after each is modulated independently, they can be multiplexed in symbols together in time and frequency domain when it is necessary, FIG. 4 is an exemplary diagram illustrating bit multiplexing of coded MUP with bit-level multiplexed overhead channel. Here, the process of channel coding the data streams and the overhead information are described in FIG. 3. However, independently channel coded data streams and the overhead information are then multiplexed together using bit multiplexing before being modulated.

Figure 5:
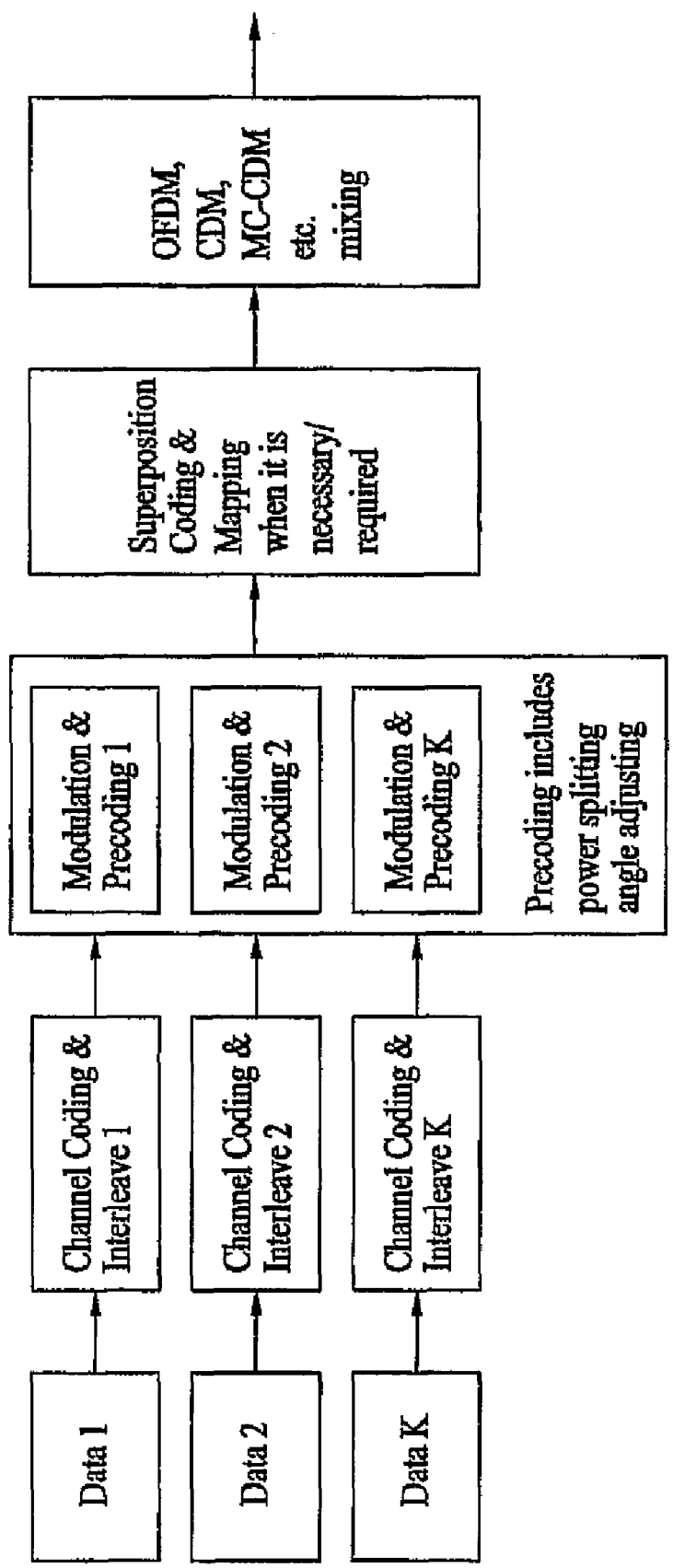
FIG. 5 is an exemplary diagram illustrating generating superpositioned symbol.

FIG. 5 is an exemplary diagram illustrating generating superpositioned symbol. Referring to FIG. 5, data streams from multiple sources (e.g., data 1-data K) are channel coded. They can then be modulated using a modulation scheme such as a low-order modulation scheme. Here, preceding includes power splitting and angle adjusting. Thereafter, the precoded data streams can be superposition coded (e.g., OFDM, CDM, or MC-CDM) and mapped if necessary and/or required. Thereafter, the superposition modulated or layered-modulated sub-streams can again be multiplexed (or superpositioned) by other multiplexing schemes.

Figure 6:
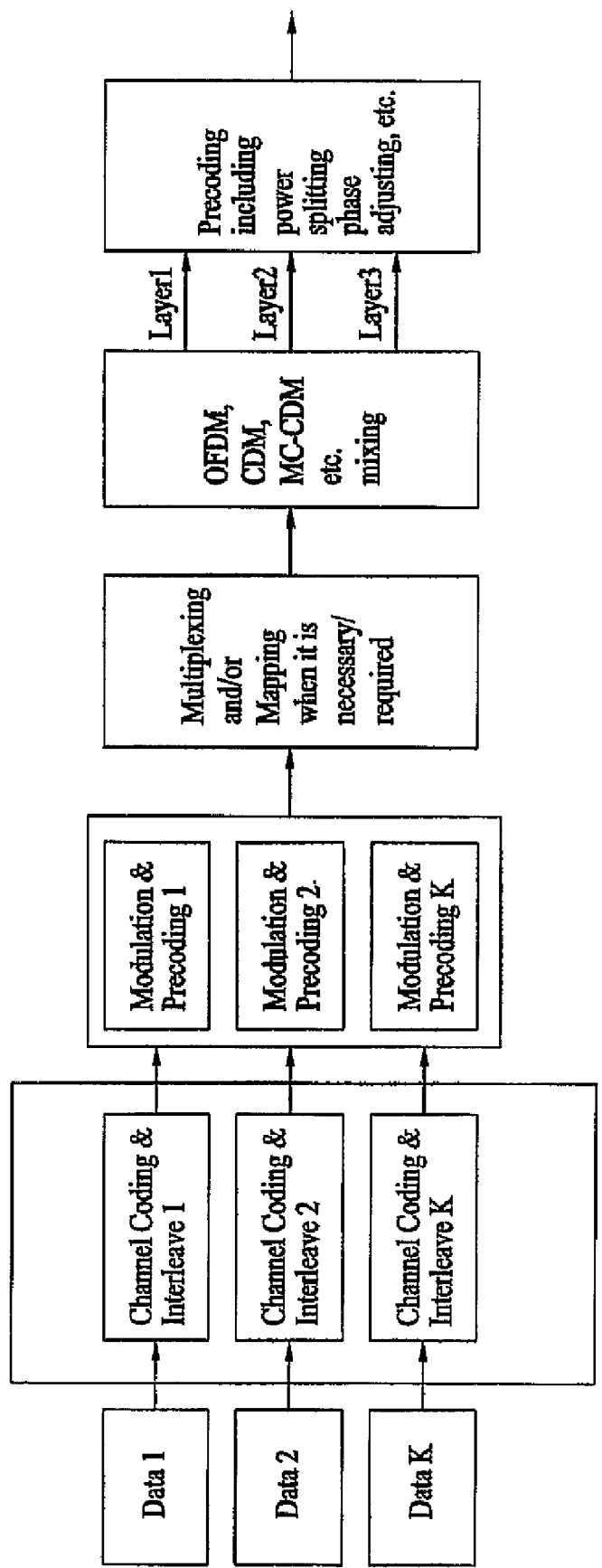
FIG. 6 is an exemplary diagram illustrating generation of superposition precoded symbol.

FIG. 6 is an exemplary diagram illustrating generation of superposition precoded symbol. Referring to FIG. 6, the data streams from multiple sources are processed as described with respect to FIG. 4. However, the superpositioned symbols can be multiplexed into different layers (e.g., layer 1-layer L). Thereafter, the superpositioned symbols from multiple layers can be precoded. Here, the precoding schemes can include power splitting and phase adjusting, among others.

Figure 7:
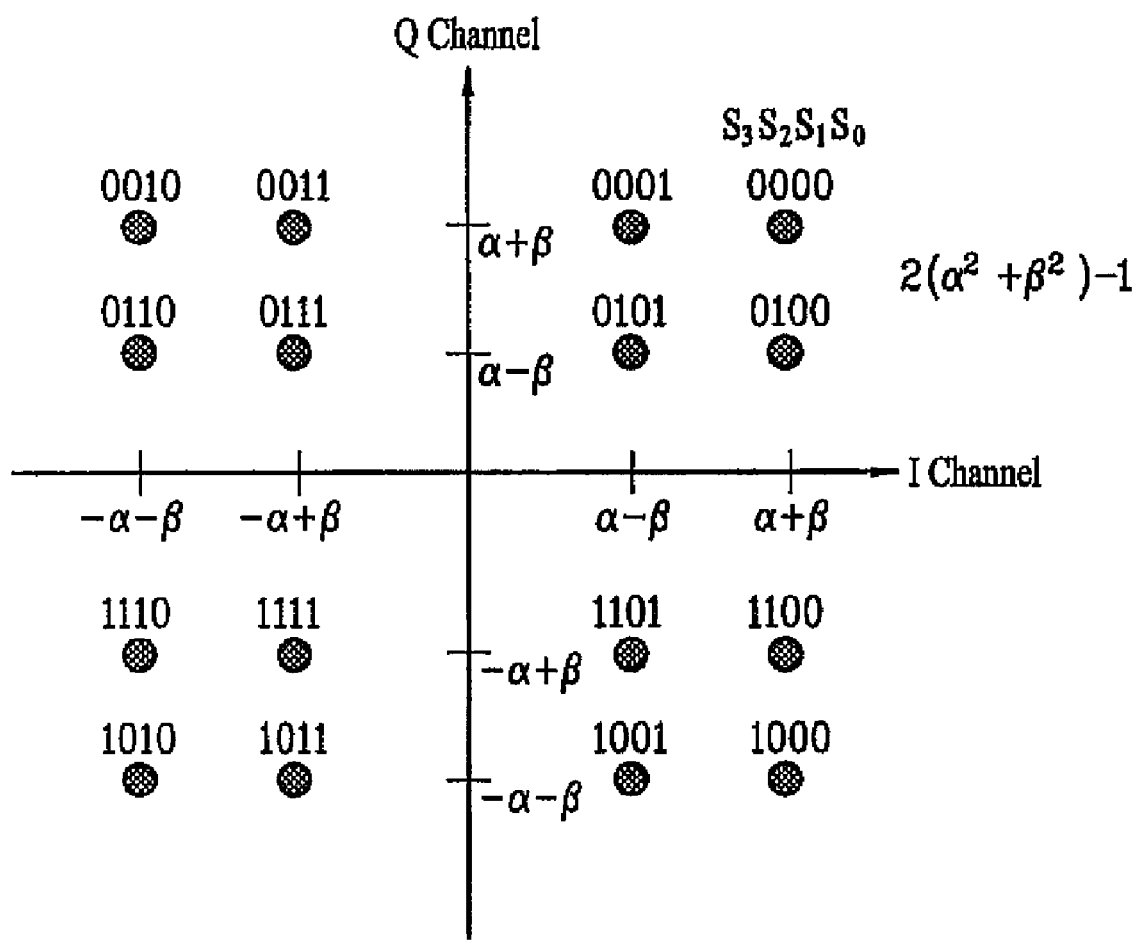
FIG. 7 is an exemplary diagram of signal constellation for superpositioned/layered modulation.

Superposition modulation or layered modulation is a type of modulation in which each modulation symbol has bits corresponding to both the base and enhancement component of a flow. It can be used for wireless broadcast system. FIG. 7 is an exemplary diagram of signal constellation for superpositioned/layered modulation In FIG. 7, $$\alpha = \sqrt{\frac{r}{2(1+r)}},$$

$$\beta = \sqrt{\frac{1}{2(1+r)}}$$

and r is the ratio of the base component energy to the enhancement component energy.

Further, superpositioned/layered modulation divides data stream into base component that all users can decode, and enhancement component that only users with high signal-to-noise ratio (SNR) can decode. For example, uniform or non-uniform 16-quadrature amplitude modulation (16-QAM) constellations with 2 bits used for base component and 2 bits for enhancement component. Outer and inner coding can be performed independently for base and enhancement components.

Figure 8:
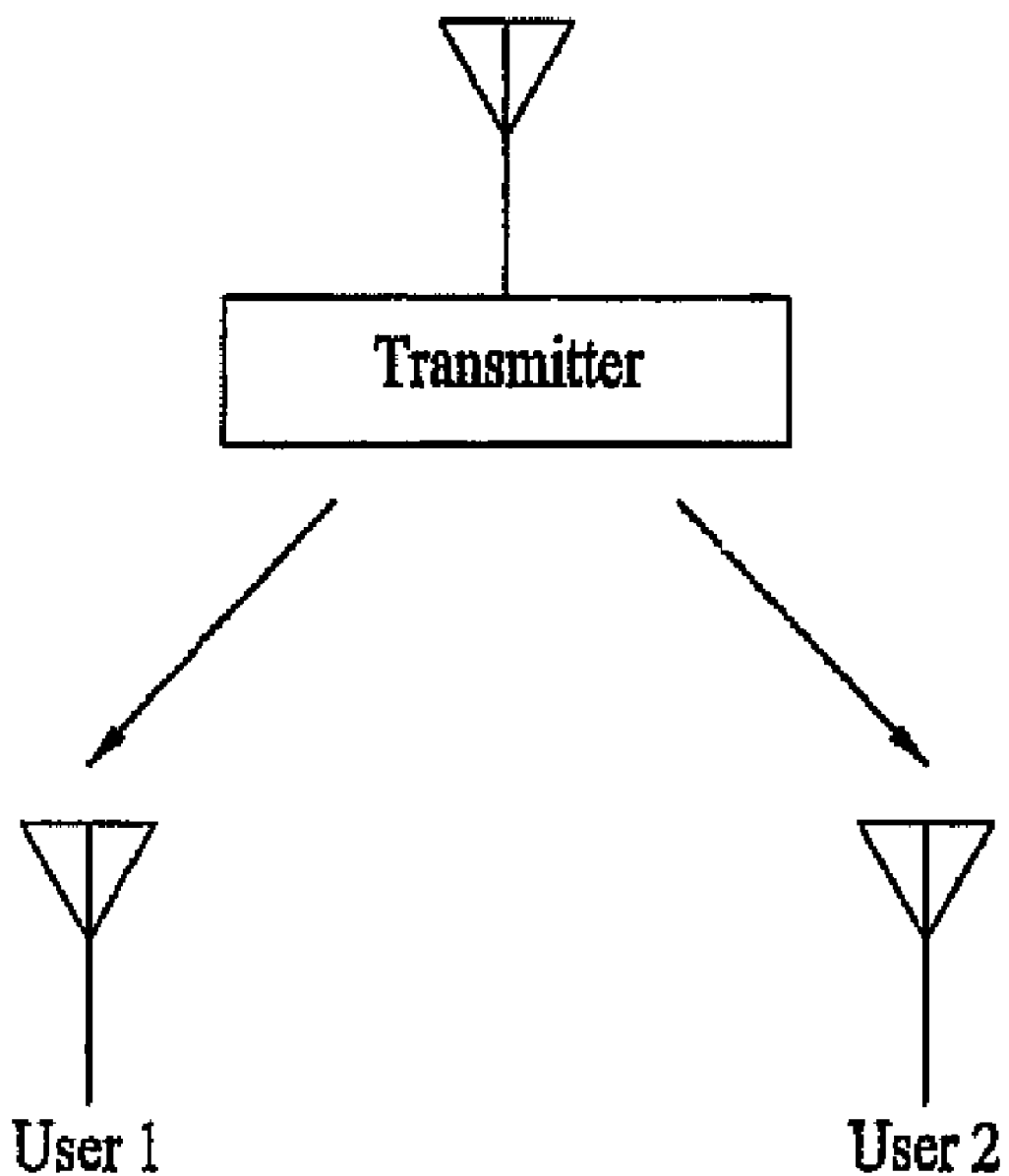
FIG. 8 illustrates a transmitter for sending independent information to each user.

With respect to superposition coding, a broadcast channel has a single transmitter communicating information simultaneously to several receivers (or users). The information communicated to each user may be the same (e.g. TV broadcast) or it may be separate for each user (e.g. base station transmitting user-specific information). FIG. 8 illustrates a transmitter for sending independent information to each user. Here, the transmitter is assumed to have average transmission power P communicating with two users in the presence of additive Gaussian noise.

Figure 9:
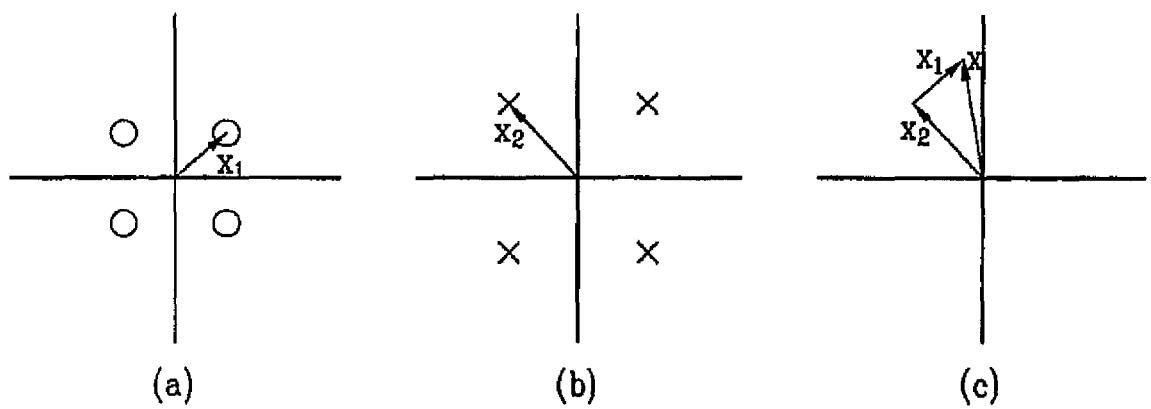
FIG. 9 is an exemplary diagram illustrating superposition coding.

FIG. 9 is an exemplary diagram illustrating superposition coding. Referring to FIG. 9, two users are each using QPSK constellation. From the figure, the transmitted signal at time k $x_k$, is the sum of the two user signals and is given by $x_k = x_{1k} + x_{2k}$.

Further, each user decodes its data separately. The decoding scheme used at the receivers can be successive interference cancellation (SIC). The main idea is that if user 1 can decode its data successfully from $y_1$, then user 2, which has the same total SNR, should be able to decode the data of user 1 from $y_2$. Then user 2 can subtract the codeword of user 1 from $y_2$ to better decode its data.

Referring FIG. 9, the transmitted signal at time k, $x_k$, is the sum of the two user signals and can be expressed by $x_k = x_{1k} + x_{2k}$. Here, each user decodes the data streams independently. The decoding scheme that can be used by the receiving end can be a successive interference cancellation (SIC) scheme.

A main idea here is that if a first user is able to decode its data stream successfully from $x_1$, then if a second user, whose total SNR is same or not as total SNR of the first user, should be able to decode the data of the first user from $x_2$. Subsequently, the second user can better decode its data stream by subtracting the codeword of the first user from the codeword of the second user.

With multiple layers involved in superposition coding and/or layered modulation, interlayer interference can occur. For example, due to noise-liked pollution from layer 2 modulations, channel capacity and demodulation performance (e.g., higher bit error rate) for layer 1 symbols can be decreased. By way of illustrating channel capacity loss, for example, the capacity can be expressed by $$C_1 = W\log_2\left(1 + \frac{P_1}{\sigma_0^2}\right).$$

However, as a result of capacity loss, the channel capacity of layer 1 can be expressed by $$\tilde{C}_1 = W\log_2\left(1 + \frac{P_1}{P_2 + \sigma_0^2}\right).$$

Further, instead of $$C_2 = W\log_2\left(1 + \frac{P_2}{\sigma_0^2}\right),$$

layer 2 channel capacity can be expressed by $$\tilde{C}_2 = W\log_2\left(1 + \frac{P_2}{\varepsilon + \sigma_0^2}\right),$$

where $\varepsilon$ is the inter-layer interference energy due to remnants (or incompletely removing) of layer 1 energy.

Further, as a result of noise-like pollution or layer 2 interference, demodulation performance can be decreased in form of higher bit-error rate. That is, a minimum Euclid distance of layer 1 signal can be smaller than the original. By way of illustration, the higher bit error rate is discussed below. Assume that a maximum likelihood detection scheme is employed at the receiving end. The corresponding probability of symbol error can be given by $$P_e \approx NQ\left(\sqrt{\frac{\gamma d_{min}^2}{2}}\right)$$

where $\gamma$ denotes the average signal-to-noise ratio (SNR), N is the number of the nearest neighbors, and $d_{min}$ is the minimum Euclid distance of the combined modulation constellation. Here, due to inference from layer 2, the minimum Euclid distance of layer 1 signal is smaller than the original signal.

It is important to maximize the minimum Euclid distance, $d_{min}^2$, of the layered- or superpositioned-signal constellation without changing the signal power distribution. To this end, a signal rotation approach can be implemented to maximize the minimum Euclid distance, $d_{min}^2$.

Figure 10:
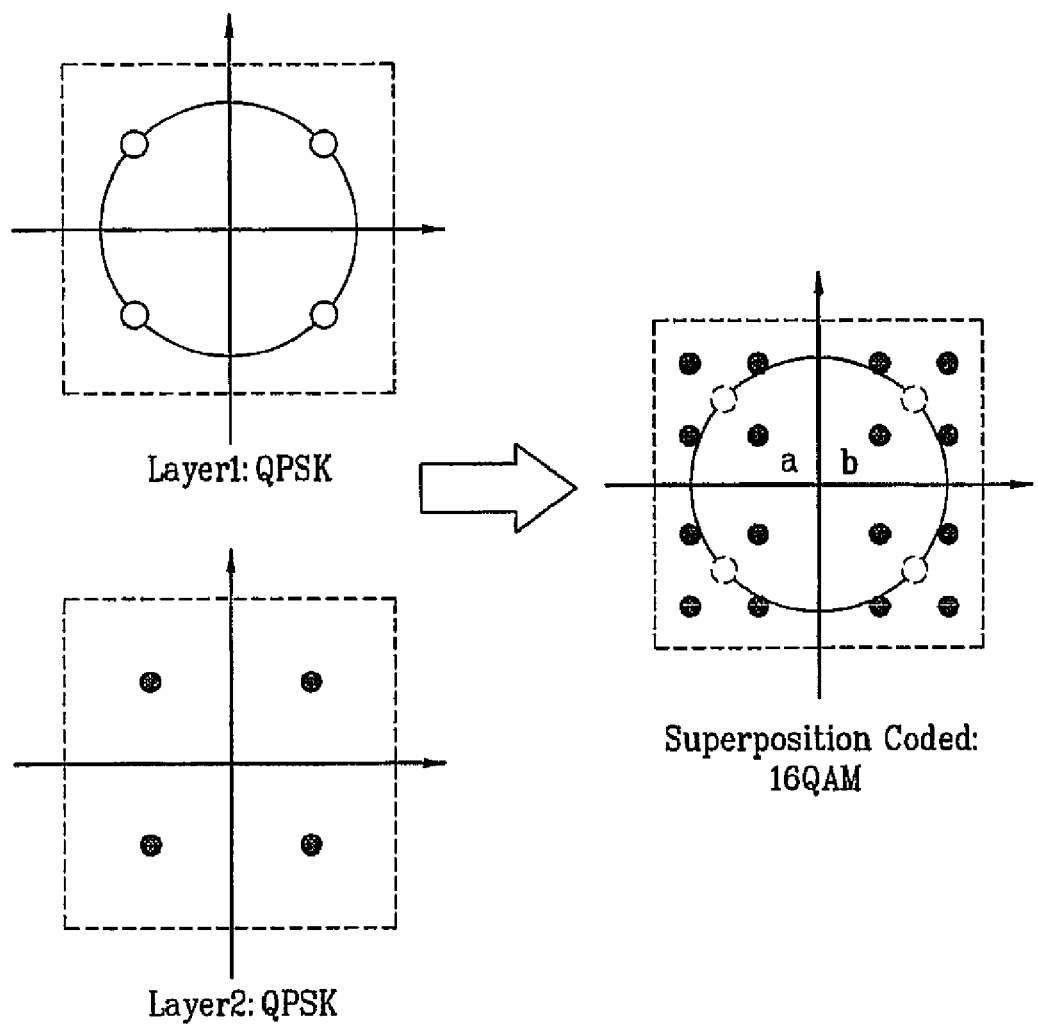
FIG. 10 is an exemplary diagram of superposition modulation.

FIG. 10 is an exemplary diagram of superposition modulation. In FIG. 10, layer 1 (inner layer) and layer 2 (outer layer) are modulated according to the QPSK scheme. Here, it is likely that the superposition modulation results in a mostly non-uniform 16 QAM. The transmission powers of layer 1 and layer 2 can be expressed as $P_1=A_1^2$ and $P_2=A_2^2$, respectively, where $A_1>A_4$.

The superposition coded modulation constellation can be expressed as $$(x\ \ y) = \left(\pm\frac{\sqrt{2}}{2}A_1 \pm \frac{\sqrt{2}}{2}A_2 \pm \frac{\sqrt{2}}{2}A_1 \pm \frac{\sqrt{2}}{2}A_2\right).$$

Further, the position of point a is $$a = [x_a\ \ y_a]^T = \left[-\frac{\sqrt{2}}{2}A_1 + \frac{\sqrt{2}}{2}A_2 + \frac{\sqrt{2}}{2}A_1 - \frac{\sqrt{2}}{2}A_2\right]^T,$$

and the position of point b is $$b = [x_b\ \ y_b]^T = \left[+\frac{\sqrt{2}}{2}A_1 - \frac{\sqrt{2}}{2}A_2 + \frac{\sqrt{2}}{2}A_1 - \frac{\sqrt{2}}{2}A_2\right]^T.$$

As such, the minimum Euclid distance of the superposition coded constellation is the same as the distance between a and b, as expressed by $\Delta_{min}=\|a-b\|_2^2=2(A_1-A_2)^2$.

FIG. 1 is an exemplary diagram of an enhanced superposition coding scheme. Similar to FIG. 10, layer 1 (inner layer) and layer 2 (outer layer) are modulated according to the QPSK scheme. However, in FIG. 6, layer 2 modulation constellation is rotated to maximize the minimum Euclid distance of the layered or superpositioned signal constellation.

With the rotated layer 2 modulation constellation, the position of point a can be expressed by $$\hat{a} = [\hat{x}_a\ \ y_a]^T = \left[-\frac{\sqrt{2}}{2}A_1 + A_2\cos\left(\frac{\pi}{4}-\theta\right) + \frac{\sqrt{2}}{2}A_1 - A_2\sin\left(\frac{\pi}{4}-\theta\right)\right]^T,$$

and the position of point b can be expressed by $$\hat{b} = [\hat{x}_b y_b]^T = \left[+\frac{\sqrt{2}}{2}A_1 - A_2\sin\left(\frac{\pi}{4}-\theta\right) + \frac{\sqrt{2}}{2}A_1 - A_2\cos\left(\frac{\pi}{4}-\theta\right)\right]^T,$$

and position of c can be expressed by $$\hat{c} = [\hat{x}_c y_c]^T = \left[+\frac{\sqrt{2}}{2}A_1 - A_2\cos\left(\frac{\pi}{4}-\theta\right) + \frac{\sqrt{2}}{2}A_1 - A_2\sin\left(\frac{\pi}{4}-\theta\right)\right]^T.$$

Based on these positions, the Euclid distance between $\hat{a}$ and $\hat{c}$ is $$\hat{\Delta}_{ab}(\theta) = \|\hat{a}-b\|_2^2 = \left[-\sqrt{2}A_1 + \left(\cos\left(\frac{\pi}{4}-\theta\right) + \sin\left(\frac{\pi}{4}-\theta\right)\right)A_2\right]^2 + \left[\cos\left(\frac{\pi}{4}-\theta\right) + \sin\left(\frac{\pi}{4}-\theta\right)\right]^2 A_2^2$$

Further, the Euclid distance between $\hat{a}$ and $\hat{c}$ is $$\hat{\Delta}_{ac}(\theta) = \|\hat{a}-b\|_2^2 = \left[-\sqrt{2}A_1 + 2\cos\left(\frac{\pi}{4}-\theta\right)A_2\right]^2 + 4\sin^2\left(\frac{\pi}{4}-\theta\right)A_2^2.$$

Consequently, with respect to the minimum Euclid distance for a user sending the data stream to two users, for example, can be maximized when $\hat{\Delta}_{min}=\Delta_{ab}(\theta_{npt})=\Delta_{ac}(\theta_{npt})$.

Figure 11:
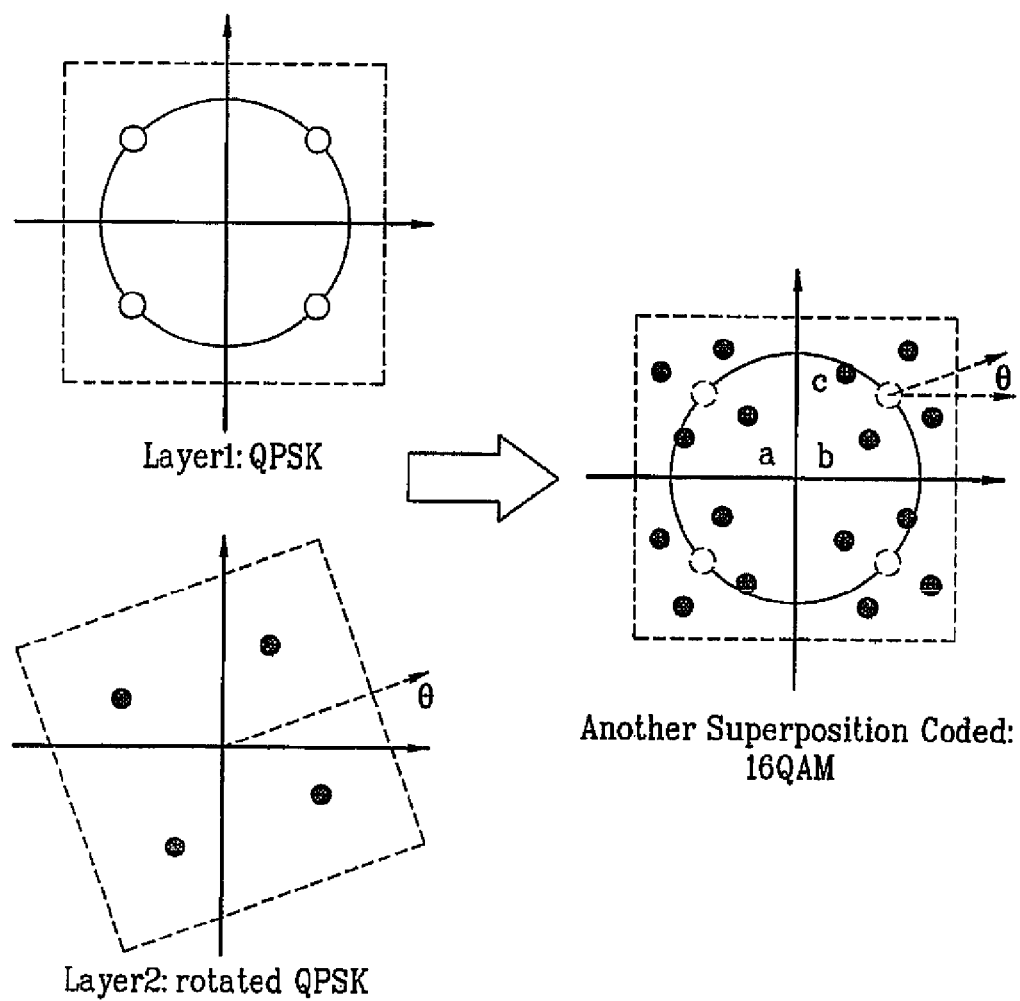
FIG. 11 is an exemplary diagram of an enhanced superposition coding scheme.

The discussion above regarding superposition pre-coding scheme as described in FIGS. 9-11 can be further described as follows. A reference modulation symbol from a first group of modulation symbols can be selected. The reference modulation symbol can be located in a first layer and can be based on power or power level. As such, the first group of the modulation symbols can be associated with the first layer.

In addition, a multiple modulation symbols from a second group can be selected. The multiple modulation symbols are closer in distance to the reference modulation symbol than other modulation symbols of the second group are to the reference modulation symbol. As such, the second group of the modulation symbols can be associated with the second layer. Moreover, each group of the modulation symbols, such as the first group and the second group, comprises more than one modulation symbol.

Thereafter, a rotation angle by which the modulation symbols are to be rotated for transmission can be determined.

Here, the rotation angle can be determined when a distance between the reference modulation symbol of the first group and a first modulation symbol of the multiple modulation symbols of the second group is equal to the reference modulation symbol of the first group and a second modulation symbol of the multiple modulation symbols of the second group. Lastly, at least one group of the modulation symbols according to the rotation angle can be rotated, The discussion of above relates to an example where both layers use the QPSK schemes. However, the above idea is not limited to both layers using the QPSK schemes but can also be applied to any other possible combinations of the same or different modulation types. For example, as illustrated in FIG. 12, layer 1 and layer 2 are both modulated according to the BPSK scheme. Here, layer 2 BPSK constellation is rotated. Consequently, the superposition modulation results in QPSK.

Figure 13:
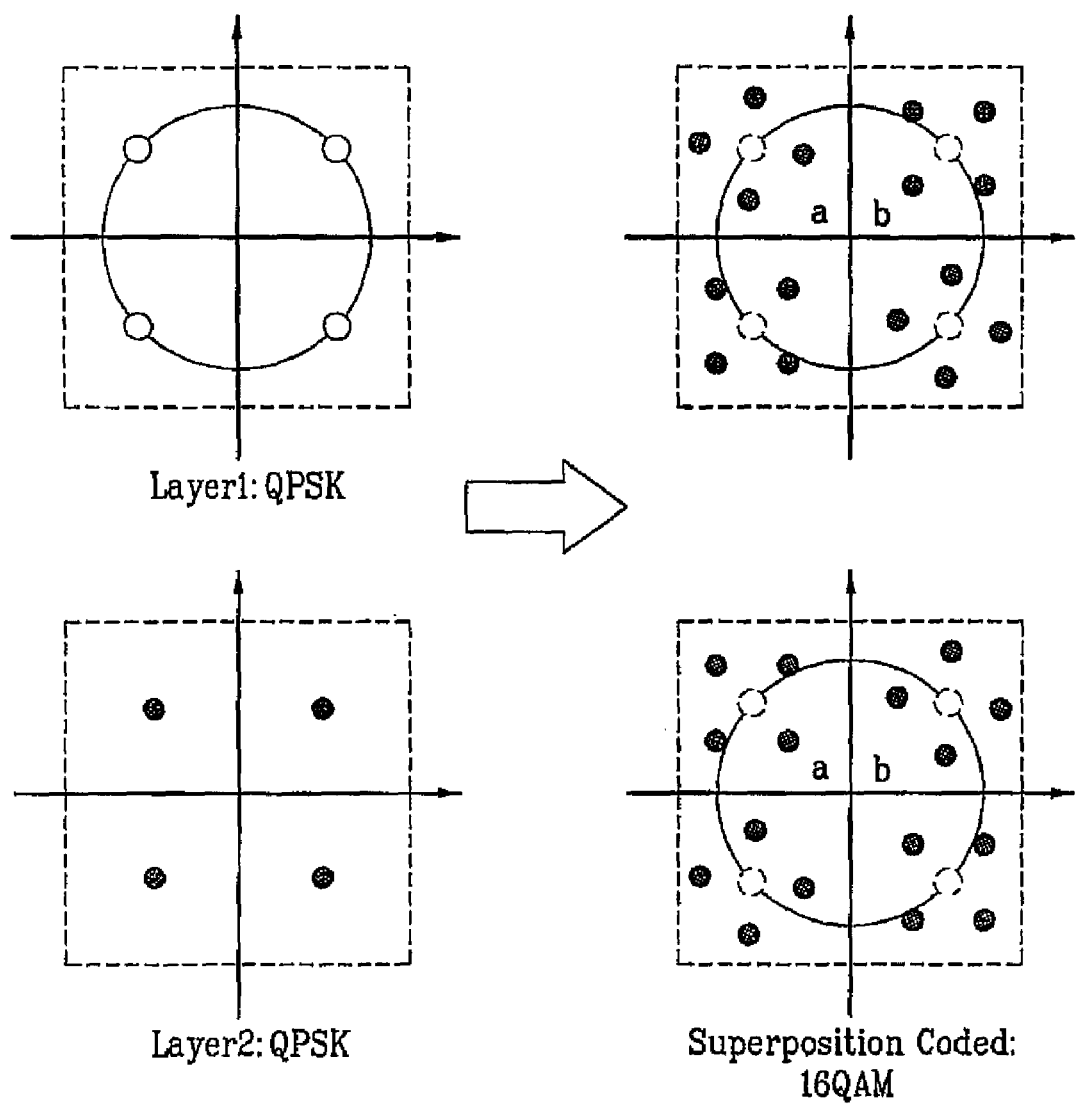
FIG. 13 illustrates an example of some or all of layer 2 signal modulation constellation.

Further, as illustrated in FIG. 13, some or all of layer 2 signal modulation constellation can be properly rotated before superposition so that the minimum Euclid distance of the layered or superpositioned signal can be maximized. This idea can be applied on any other possible combinations of different or same modulation types.

As discussed, different transmission power for different antennas based on channel condition can be employed. This is assuming that the channel condition is known. In possible situations where the channel condition is not known, equal transmission power may be applied to each antenna. Alternatively, a pre-defined transmission power scheme may be applied to each antenna. For example, assuming there are two antennas, a first antenna transmits using a specified transmission power, and a second antenna transmits using a higher transmission power than that of the first antenna.

With this, by way of illustration, two sub-streams can be independently transmitted through two different antennas, thus allowing the system to achieve spatial multiplexing gain (or spatial diversity). Furthermore, the spatial multiplexing gain can be achieved with two receivers/antennas jointly decoding the received composite stream.

After the transmitting end transmits the precoded sub-streams, the receiving end can apply different demodulation schemes to extract the original data. In performing demodulation, as discussed, it is preferable to use directed demodulation without channel estimation and equalization. However, channel estimation and equalization may be necessary if the channel condition is poor or if there is channel distortion. As such, if there is channel distortion, channel estimation may be performed on per-channel and/or per-antenna basis. After the channel estimation, various detection schemes can be performed.

For example, channel equalization can be performed on each channel, followed by joint detection. Moreover, a successive interference cancellation scheme can be used in which channel equalization and detection is performed on the channel having the strongest or best condition. Subsequently, this channel can be subtracted from the total received signal before the equalization and detection of the next strongest channel. Further, a maximum-likelihood detection scheme can be used in which a joint channel equalization and detection are performed on all channels.

If the transmitter is used to serve multiple users at the same time or in the same symbol (or the same slot), the transmitter may allocate the channel resources to other served users based on different quality of service (QoS) requirements. Here, the channel resources include transmission power, frequency subbands (e,g., OFDM tones), sub-symbol time, and spreading sequences (e.g., PN code).

For example, based on optimizing Shannon capacity, the transmitter generally transmits more power to the user(s) with better channel conditions and less to relatively less power to the user(s) with poor channel conditions with respect to the maximization of the sum throughput of all users. As another example, with respect to the delay of each user data rate (e.g., optimizing delay-limited capacity), the transmitter may allocate more channel resources to the weak user(s) which have poor channel conditions so that the weak user(s) may obtain higher data rate. In comparison, the transmitter of the first example bases its stronger transmission power on user(s) having good/better channel conditions whereas the transmitter of the second example bases its stronger transmission power on user(s) having poor/weaker channel conditions.

It is possible for the transmitter to employ a combination of the two examples. More specifically, the transmitter may transmit using more power to user(s) having weaker channel condition for delay-sensitive users. Alternatively, the transmitter may transmit using more power to user(s) having stronger channel condition for throughput-sensitive users.

As such, it is important to be able to accurately estimate the channel condition of the user or receiver. To this end, the transmitter can estimate the channel condition when each user sends signal back to the transmitter. This situation can be applicable in time-division multiple (TDD) situations. Alternatively, each user or receiver can estimate the channel condition and send back to the transmitter through a feedback channel (e.g., data rate control (DRC) channel or a channel quality indicator (CQI) channel). This situation can be applicable in code division multiple access (CDMA) 2000 evolution-data only (EV-DO).

Usually, the signal for a weak user can be superposition pre-coded with the signal for a strong user with a better channel condition. Each user can feedback its channel condition information through DRC channels to the transmitter. Typically, the weak user's data will be transmitted using lower data rate formation, with possible high-rate channel coding and/or low-order modulation. For example, a larger portion of the total transmission power (e.g., ⅔) can be allocated to the user having better channel condition while a smaller portion of the total transmission power (e.g., ⅓) can be allocated to the user having worse channel condition.

In the process, the transmitter may take into consideration the delay, frame error rate (FER) and/or bit error rate (BER), or other QoS requirements of each user before allocating the channel resources to each user. If a user with high data rate requirement or low-delay requirement or high QoS requirement, the transmitter will possibly use more channel resources, such as more transmit power, more data tone (if OFDMA is used), or more spreading sequence (if CDMA or MC-CDMA is used).

If the same transmit power is used to transmit to two users in superposition coding and/or the transmit powers of the two users are close to each other, which may make separation of the signals difficult for the users/receivers, then two different modulation schemes may be used. For example, a first user uses the BPSK scheme while a second user uses π/2-rotated-BPSK scheme. Alternatively, the first user uses BPSK scheme while the second user uses the QPSK scheme. Moreover, the first user uses π/4-BPSK scheme while the second user uses the QPSK scheme, or the first user uses the classic BPSK scheme while the second user uses the π/4-rotated QPSK scheme.

Further, modulation diversity can be applied. The modulation diversity can be used for possibly replacing existing traditional modulation scheme(s). It can be used for superposition-coding (or superposition-modulating) or layered-coding (or layered-modulating) scheme so that every layer can be modulated with modulation diversity or power allocation and payload size of each layer. Higher layer serves OFDM packet and each chips are scaled by power allocation value.

Further, superposition coding scheme can be improved by various means, among which is to increase power and/or length of the MUP preamble to enhance the performance of preamble detection. The MUP preamble may occupy whole power up to highest layer without any OFDM data for that Mull preamble portion of time. For example, referring to FIG. 14 (below), if the OFDM symbol duration is 400 chips and preamble length is 64 chips (or more), then OFDM symbol duration in the first 400 chips of $1^{st}$ sub-slot of packet may be reduced to 336 chips (or less) to allocate more power to the preamble.

Further, similar to the current DO, the length of MUP preamble can be extended to increase the preamble detection probability. That is, the lengths (or duration) of the preamble can be extended (e.g., 64 chips, 128 chips, 256 chips, 400 chips).

As another superposition coding scheme, independent early termination of layer(s) is possible. If layer 1 is early terminated while at least one upper layer data is not early terminated, layer 1 may move onto a new packet while the upper layer data may be retransmitted. That is, if layer 1 is early terminated (e.g., layer 1 is successfully decoded), a new MUP packet can be transmitted with the same information for higher layers (e.g., OFDM data) and new traffic data for the legacy CDM layer 1 users. Here, if layer 1 is successfully decoded or early terminated, only the layer(s) which has/have not been successfully decoded are retransmitted with data with same information.

In contrast, a scheme similar to a type of "blind detection" can be employed. More specifically, the receiving end (e.g., mobile station, access terminal, or mobile terminal) can try out various or all different power ratio combinations using all possible scenarios in case one or more layers are early terminated. For example, if an upper layer data transmission is early terminated while layer 1 still requires re-transmissions, more power can be allocated to other remaining layers.

For example, assume that power allocated to layer 1 is '$\alpha_1$', power allocated to layer 2 is '$\alpha_2$', and power allocated to layer 3 is '$\alpha_3$'. If layer 3 is early terminated (e.g., successful decoding hence no transmission is necessary to layer 3), then '$\alpha_3$' (which is the power allocated to layer 3) can be allocated to layer 1 or layer 2. Subsequently, layer 1 can blindly detect its power. In other words, since non-terminated layer (layer 1 or layer 2) does not know which layer has been early terminated. Hence, layer 1 user may try to detect its signal blindly assuming all possible combinations of power allocation—in this example, '$\alpha_1$' and/or '$\alpha_1+\alpha_2$'.

In this case, the power ratios (e.g., ratio of each remaining upper layer to a lower layer(s)) can change without prior knowledge of the remaining access terminal, for example. In short, power can be allocated or transferred by early terminated layer to other non-terminated layer(s).

The discussion of above can be generalized over multiple re-transmissions. In which case, the number of combinations can increase to account for various soft-combining options.

Further, higher layer packets over OFDM/CDM layer 1 can be CDM data and/or OFDM data instead of having only OFDM data (all combinations of Superposition Coding, e.g., CDM layers or OFDM layers or CDM layers+OFDM layers over CDM layer 1). In addition, OFDM or CDM preamble can be inserted in the higher layer to support OFDM/CDM transmission together with OFDM/CDM data transmission.

In addition, it is possible to use a non-layered modulation scheme in modulating symbols. For example, assuming there are three (3) layers, the first layer can be modulated using a non-layered modulation scheme (e.g., CDM) while modulating symbols associated with second and third layers using different layered-modulation schemes (e.g., OFDM, MC-CDM). Here, the symbols associated with the second layer and the third layer can be multiplexed by any one of OFDM, CDM, MC-CDM, or TDM. That is, each layer can be modulated using any one of the modulation schemes (e.g., OFDM, CDM, MC-CDM). Furthermore, the different layered-modulation scheme includes modulating the at least two sub-streams using layered-modulation schemes in which at least one layer is rotated with respect to at least one other layer.

As discussed, a preamble can be included in the first layer. The preamble can have variable power and/or variable length. Moreover, in the first layer, a region can be allocated for carrying at least one common pilot.

Figure 14:
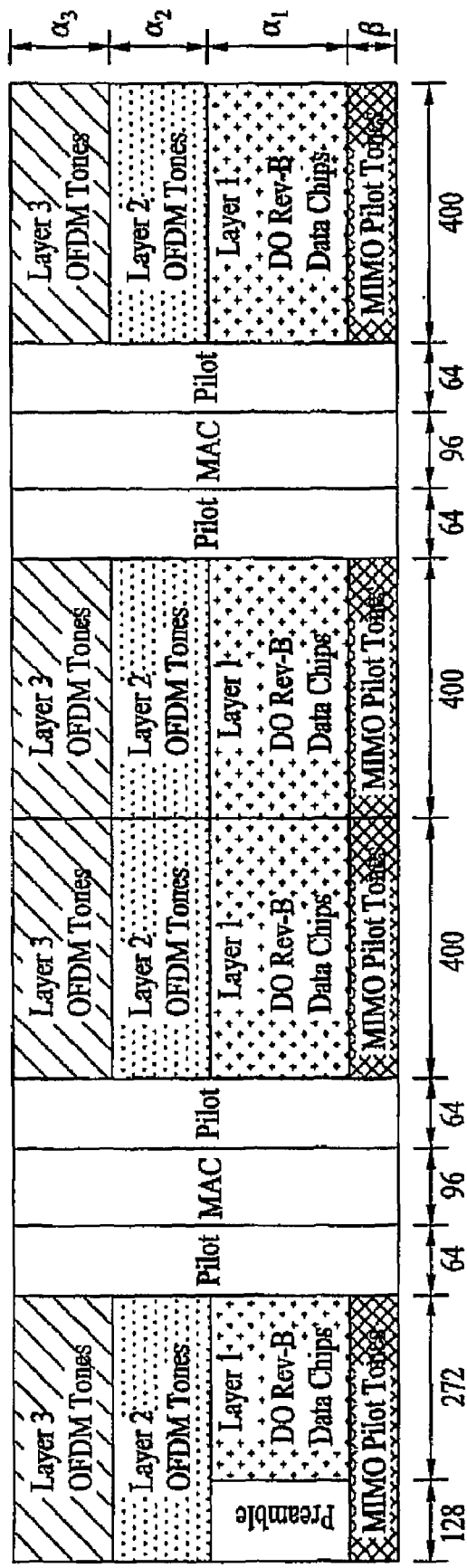
FIG. 14 is an exemplary diagram illustrating superposition coding of multiuser packet (MUP)

FIG. 14 is an exemplary diagram illustrating superposition coding of multi-user packet (MUP). The superposition coding (SPC) packet consists of multiple packets with different power allocations {$\alpha_i P_T$}. Referring to FIG. 1, the overall packet structure of a SPC packet has three (3) layers (K=3) layers and a 128 bit preamble. Moreover, if the interlaces contain multi-input multi-output (MIMO) pilot, $\beta \neq 0$. This is true only for interlaces that contain MIMO pilot. The remaining layers 1 through N contain packets of the superposed users, During any SPC slot, $$\beta + \sum_{i=1}^{K} \alpha_i = 1.$$

The information about the SPC packet is embedded in the lowermost layer or layer 1. FIG. 15 is an exemplary diagram illustrating a layer of the lowest layer packet. In FIG. 15, SPC MAC Id is used to convey that the packet is superposition coded. K number of layers are indicated as well as medium access control (MAC) identification (ID), $\alpha$, and payload for each layer. Here, the MAC ID can be used to indicate presence of MUP in higher layers. In addition, data for layer 1 user(s) can be available to indicate SPC or MUP for the user(s) scheduled in the lowest layer.

FIG. 16 is an exemplary diagrams illustrating superposition-coded MUP with common pilots. Here, a symbol length or duration is 400 chips and/or multiples thereof Moreover, the symbol duration can also be referred to as a sub-slot or a quarter slot.

Referring to FIG. 16, the symbol duration can include various symbols such as OFDM symbol, CDM symbol, and multi-carrier CDM symbol (MC-CDM). Furthermore, the common pilots can be allocated to symbol duration in layer 1 so as to help with decoding.

As discussed, the symbol duration or a sub-slot (or quarter slot) is 400 chips which can be allocated variably in each layer. If the interlaces contain common pilots, then $\beta \neq 0$. In other words, the common pilots can be included as a part of or in addition to the layers.

The common pilots can be allocated to the entire duration of the symbol or part of the duration of the symbol. For example, (a) of FIG. 16 illustrates the common pilots allocated to entire symbol duration is the 400-chip first sub-slot, to portion of symbol duration in the second 800-chip sub-slot, and to the entire symbol duration is the 400-chip third sub-slot. In (b) of FIG. 16, in addition to the common pilots allocated to entire symbol duration is the 400-chip first sub-slot, the common pilots are allocated to the entire second 800-chip sub-slot but not in the third 400-chip sub-slot, In (c) of FIG. 16, the first sub-slot has the common pilots allocated, a portion of the second sub-slot has common pilots allocated, and the third sub-slot does not have common pilots allocated.

Further, the symbols can be allocated variably per each layer and per each sub-slot as well as independently of the layers. That is, assuming that the symbol duration or the sub-slot length is 400 chips and/or multiples thereof the certain symbol type (e.g., OFDM, CDM, or MC-CDM) can be allocated to the symbol duration in part or entirely. For example, (a) of FIG. 6 shows certain type of symbols allocated to the first sub-slot in which a specific symbol is allocated to each layer of the 400-chip duration. Moreover, the second sub-slot shows a specific symbol allocated to the entire symbol duration in the second and third layers but in the first layer, the specific symbol is allocated in two parts with one of the parts having the common pilots allocated thereto. The allocation of the symbols in the third sub-slot is the same as that of the first slot.

In (b) of FIG. 16, the allocation of the symbols in the first slot is the same as that of the first slot of (a). However, in the second slot, an allocation of certain symbols exceeds more than one layer. As discussed, the symbols can be allocated independently of the layers. In addition, the third sub-slot of (c) of FIG. 16 illustrates the same point. It is possible for the symbols to be allocated to more than one layer or any additional portion thereof.

Moreover, the symbols can be allocated to the entire sub-slot or portion of the sub-slot without restrictions to the layers. As shown in (c) of FIG. 6, the symbols are allocated to a portion of the 800-chip duration of the second sub-slot without division of layers. Similarly, it is possible for the symbol to be allocated to the entire sub-slot.

Figure 17:
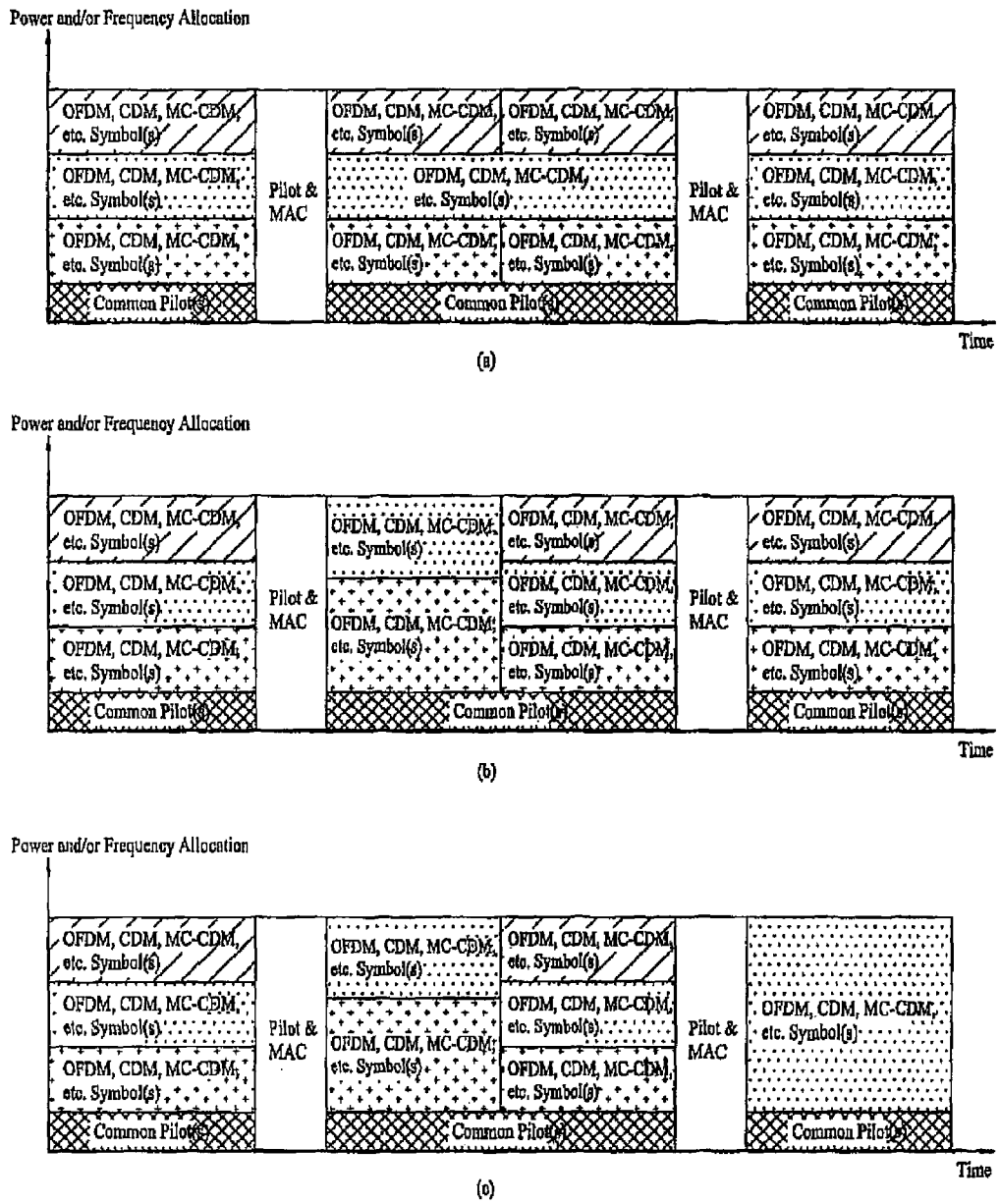
FIG. 17 is another diagram illustrating superposition-coded MUP with common pilots.

FIG. 17 is another diagram illustrating superposition-coded MUP with common pilots. Here, the common pilots can be allocated to every sub-slot for the entire symbol duration whereas in FIG. 16, the common pilots can be allocated to entire or part of the sub-slot or in some sub-slots, the common pilots are not allocated. As for allocation of the symbols, the discussion of FIG. 16 can be applied.

FIG. 18 is another diagram illustrating superposition-coded MUP with common pilots. Here, the common pilots can be allocated in variably as is the case in FIG. 16, In FIG. 18, the symbol durations are not fixed but can be variable. Further to the discussion with respect to FIG. 16, in which the symbol duration is 400 chips and/or multiples thereof, the symbol duration as described in FIG. 8 does not have to be 400 chips or multiples thereof. In other words, the symbol durations can be variable.

For example, the second sub-slot of (a) of FIG. 18, the symbol durations of the second layer are different whereas the symbol durations of other layers are the same. In other words, the symbol durations of the symbols of the second layer can be greater than or less than 400 chips and does not have to be multiples of 400 chips. Similarly, the symbol durations of each layer can vary.

With respect to other discussions associated with allocation of the symbols, the discussion of FIGS. 16 and 17 can be applied.

FIG. 19 is an exemplary diagram illustrating superposition-coded MUP without coexisting common pilots. The only difference with the example of FIG. 19 from FIGS. 16-18 is that the common pilots do not coexist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of configuring a sub-slot having a layer-modulated multi-user packet (MUP), the method comprising:
    providing, at a transmitting entity, rotation of symbols associated with a first layer relative to both a second layer and a third layer;
    modulating, at the transmitting entity, the rotated symbols associated with the first layer by using a first layered modulation scheme; and
    modulating, at the transmitting entity, symbols associated with the second layer and the third layer using a second layered-modulation scheme which is different from the first layered modulation scheme of the first layer,
    wherein the symbols associated with the second layer and the third layer are multiplexed by any one of an orthogonal frequency division multiplexing, a code division multiplexing, a multi-carrier code division multiplexing, or a time division multiplexing.

2. The method of claim 1, further comprising:
    modulating the symbols associated with the second layer and the third layer using layered-modulation schemes in which one layer of the second or third layer is rotated with respect to an other layer of the second or third layer.

3. The method of claim 1, further comprising a preamble in the first layer.

4. The method of claim 3, wherein the preamble has variable power or variable length.

5. The method of claim 1, wherein the rotated symbols associated with the first layer are modulated using a code division multiplexing (CDM).

6. The method of claim 1, wherein the second layer and the third layer are any one of orthogonal frequency division multiplexing (OFDM), code division multiplexing (CDM), and multi-carrier CDM (MC-CDM).

7. The method of claim 1, further comprising a region for carrying at least one common pilot.

8. A method of configuring a slot having a superposition coded multi-user packet, the method comprising:
    providing rotation of symbols associated with a first layer relative to both a second layer and a third layer;
    modulating, at a transmitting entity, the rotated symbols associated with the first layer using a first layered modulation scheme, wherein the modulated and rotated symbols associated with the first layer are multiplexed by any one of an orthogonal frequency division multiplexing, a code division multiplexing, a multi-carrier code division multiplexing, or a time division multiplexing; and
    modulating, at the transmitting entity, symbols associated with the second layer and the third layer using a second layered-modulation scheme which is different from the first layered modulation scheme of the first layer, wherein the symbols associated with the second layer and the third layer are multiplexed by any one of an orthogonal frequency division multiplexing, a code division multiplexing, a multi-carrier code division multiplexing, or a time division multiplexing.

9. The method of claim 8, wherein the symbols multiplexed for the second layer and the third layer are multiplexed by same multiplexing scheme.

10. A method of transmitting at least one layer-modulated sub-packet, the method comprising:
    if at least one layer, of a transmitting entity, successfully transmits the sub-packet while at least one other layer fails to successfully transmit the sub-packet, the at least one layer, which successfully transmits the sub-packet, transmits a new sub-packet while the at least one other layer, which fails to successfully transmit the sub-packet, re-transmits the sub-packet.

11. The method of claim 10, wherein the at least one layered-modulated sub-packet is a single user packet or a multi-user packet.

12. The method of claim 10, further comprising if at least one layer successfully transmits the sub-packet while at least one other layer fails to successfully transmit the sub-packet, a transmit power from the at least one layer, which successfully transmits the sub-packet, is allocated to the at least one other layer, which fails to successfully transmit the sub-packet.

13. The method of claim 10, further comprising a preamble in first of the at least one layer.

14. The method of claim 13, wherein the preamble has variable power or variable length.

15. The method of claim 10, further comprising a region for carrying at least one common pilot.

16. A method of receiving at least one layer-modulated sub-packet, the method comprising:
receiving, at a receiving entity, the sub-packet; and
if at least one layer associated with the receiving entity successfully decodes the sub-packet while at least one other layer fails to successfully decode the sub-packet, the at least one layer, which successfully decodes the sub-packet, transmits a new sub-packet while the at least one other layer, which fails to successfully decode the sub-packet, re-transmits the sub-packet.

17. The method of claim 16, further comprising if at least one layer successfully decodes the sub-packet while at least one other layer fails to successfully decode the sub-packet, detecting blindly at least one combination of power allocation by the at least one other layer which unsuccessfully decodes the sub-packet.

18. The method of claim 17, wherein the blind detection includes employing various and different power ratio combinations using all possible scenarios in case one or more layers is early terminated.

19. The method of claim 16, further comprising if at least one layer successfully decodes the sub-packet while at least one other layer fails to successfully decode the sub-packet, detecting at least one combination of power allocation provided by an access network (AN) by the at least one other layer which unsuccessfully decodes the sub-packet.

20. The method of claim 16, further comprising a preamble in first of the at least one layer.

* * * * *